United States Patent [19]
Renwick

[11] Patent Number: 5,588,232
[45] Date of Patent: Dec. 31, 1996

[54] VEHICLE LINKAGE

[75] Inventor: Peter J. Renwick, Hexham, England

[73] Assignee: Pearson Engineering Limited, Newcastle-on-Tyne, England

[21] Appl. No.: 299,576

[22] Filed: Sep. 1, 1994

[30] Foreign Application Priority Data

Sep. 4, 1993 [GB] United Kingdom ............... 9318392

[51] Int. Cl.⁶ ................................................. E01H 5/04
[52] U.S. Cl. .................. 37/232; 172/684.5; 280/456.1; 280/461.1
[58] Field of Search .............................. 37/231, 232, 234, 37/235, 236, 240; 172/684.5, 439, 445.1, 450, 272, 810; 280/186, 456.1, 457, 458, 461.1; 56/10.4

[56] References Cited

U.S. PATENT DOCUMENTS

| 1,858,878 | 5/1932 | Byron | 280/456.1 X |
|---|---|---|---|
| 2,191,323 | 2/1940 | Richter | 37/231 |
| 3,098,309 | 7/1963 | Koch | 37/231 |
| 3,150,884 | 9/1964 | Drott | 37/231 X |
| 4,565,018 | 1/1986 | Oya | 37/232 |
| 4,976,053 | 12/1990 | Caley | 37/231 |
| 5,037,121 | 8/1991 | Gallatin | 280/457 X |
| 5,111,603 | 5/1992 | Knowlton et al. | 37/231 |
| 5,129,170 | 7/1992 | Fusilli | 37/231 |
| 5,195,261 | 3/1993 | Vachon | 37/231 |
| 5,364,117 | 11/1994 | Keith | 280/461.1 X |

FOREIGN PATENT DOCUMENTS

| 1175371 | 12/1969 | United Kingdom . |
|---|---|---|
| 2092424 | 8/1982 | United Kingdom . |
| 2175484 | 12/1986 | United Kingdom . |
| 2222758 | 3/1990 | United Kingdom . |

Primary Examiner—Terry Lee Melius
Assistant Examiner—Victor Batson
Attorney, Agent, or Firm—Rodman & Rodman

[57] ABSTRACT

A linkage for coupling a vehicle to a ground-engaging implement consists of two links, the first link being connected at one end to the vehicle such that it can pivot both around the longitudinal axis of the link and around a line transverse to that axis and connected at its second end to the implement to pivot around a line transverse to its longitudinal axis; the second link being connected in a similar fashion but oppositely to the first link.

19 Claims, 1 Drawing Sheet

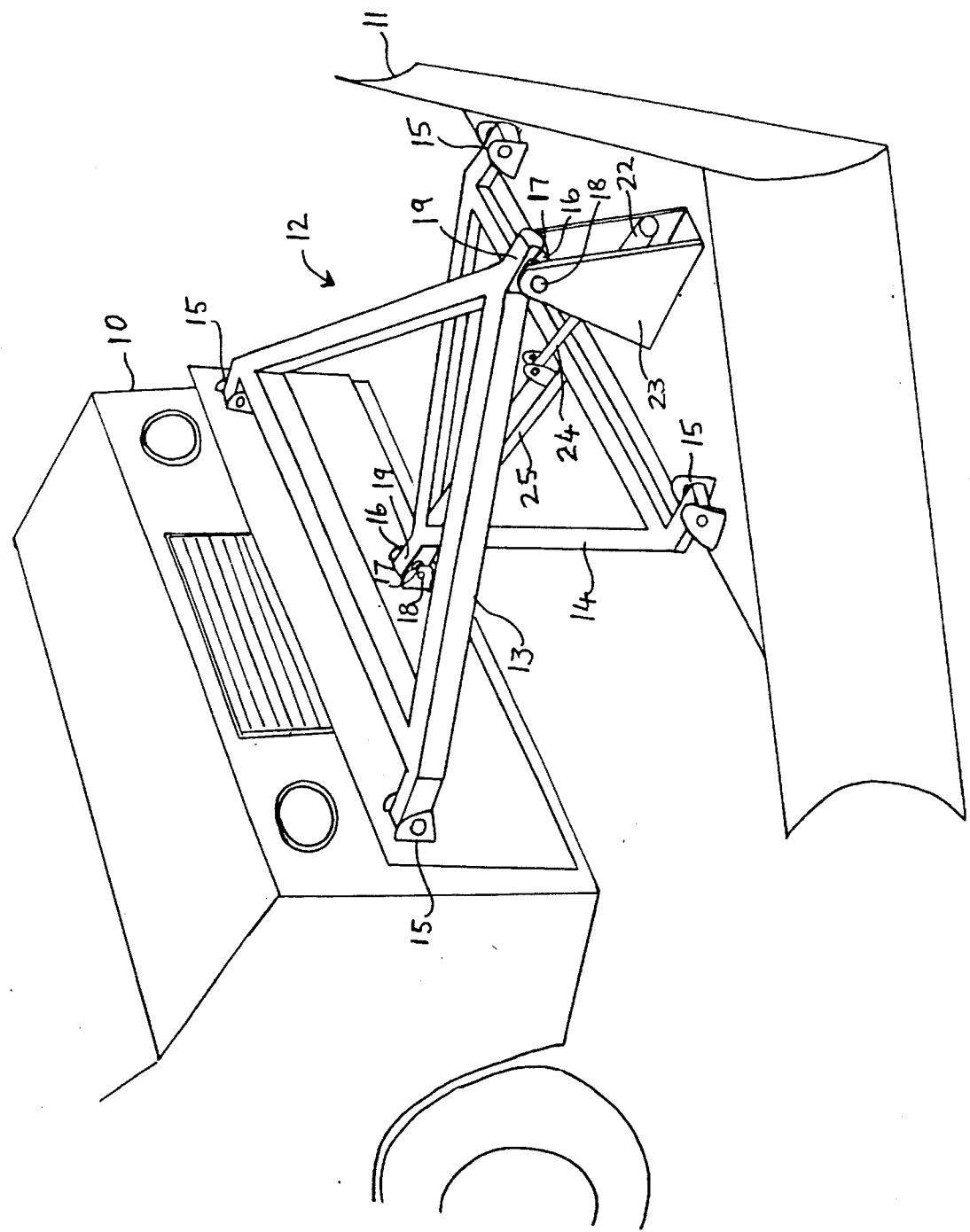

VEHICLE LINKAGE

BACKGROUND OF THE INVENTION

The present invention concerns a linkage for coupling vehicles to ground-engaging implements, for example for coupling a wheeled vehicle to a snow-plough or to agricultural machinery.

Such couplings are well-known, an example being the so called "three-point linkage" which has three pivotting linkages which can pivot up and down to allow the coupled implement to ride over bumps etc. in the ground and a fourth linkage for lifting the implement clear of the ground for transportation.

Although such linkages do allow the implement to pivot upwardly to accommodate uneven ground, they cannot allow the implement to tilt so that one side of the implement is lower than the other. Such tilting action is desirable to keep the implement close to the ground when the ground is higher on one side of the implement than on the other. A further disadvantage of these linkages is that, especially when being carried above the ground, they allow the implement to sway from side to side, which is undesirable and can be dangerous.

OBJECTS AND SUMMARY OF THE INVENTION

It is an object of the present invention to provide a linkage which overcomes some, at least, of these problems.

According to the invention, a linkage for coupling a vehicle to a ground-engaging implement comprises a first link joined at one end to the vehicle in such a way as to allow pivotal movement between the vehicle and said first link both around a longitudinal axis of said first link and around a line transverse to said longitudinal axis and joined at the other end to the ground-engaging implement in such a way as to allow pivotal movement between the implement and said first link around a line transverse to said longitudinal axis of the link; and a second link joined at one end to the vehicle in such a way as to allow pivotal movement between the vehicle and said second link around a line transverse to a longitudinal axis of said second link and joined at the other end to the implement in such a way as to allow pivotal movement between the implement and said second link around said longitudinal axis of said second link and also around a line transverse to said longitudinal axis of said second link.

The first and second links may each comprise an elongate bar or may be T-shaped, triangular, rectangular, or otherwise shaped when viewed in plan. The surfaces of the links may form a continuous plane or they may comprise a framework. The longitudinal axis of each link is aligned with the longitudinal axes of the vehicle and the implement. The first and second links are preferably disposed one above the other and spaced apart vertically. The first and second links are preferably of a similar shape and size.

The joints which join the first link to the implement and the second link to the vehicle (hereinafter referred to as "unidirectional joints") allow a pivotal motion between the respective link and the park joined thereto around a line transverse to a longitudinal axis of the respective link. A suitable joint for this purpose is a simple pinned pivot or hinge, preferably in the form of a so-called clevis joint.

The joints which join the first link to the vehicle and the second link to the implement (hereinafter referred to as "multi-directional joints") allow a pivotal motion between the respective link and the part joined thereto both around a longitudinal axis of the respective link and around a line transverse to that longitudinal axis. Those joints may comprise a combination of simple pivots or a specially-shaped pin pivot which can allow some pivotal movement both around the axis of the pin and in another direction. More preferably however, that joint will comprise a pinned ball joint.

It is advantageous for the unidirectional joint to form a connection between a link and the vehicle or implement over a relatively large proportion of the 10 width of the connected parts to improve the stability of the linkage and, in particular, to restrain the tendency of the implement to sway or swing around a vertical axis relative to the vehicle. For example, the unidirectional joint may take the form of an elongate hinged connection extending up to the entire width of the vehicle, implement or link. Alternatively a plurality of shorter unidirectional joints may be provided spaced along the join. In a preferred form of the invention in which the end of each link which is to be joined unidirectionally is of a comparable width to that of the vehicle or implement to which it is to be joined, a unidirectional pivot joint is provided at or near each side of the link. More preferably two unidirectional joints are provided, one at each side of the link which, together with a single multi-directional joint at the other end of the link define the corners of an isosceles triangle when viewed in plan, the multi-directional joint forming the apex or said triangle. Most preferably each link comprises an isosceles triangle having a joining point at or near each corner, the links being arranged vertically spaced one above the other with the apex of the respective triangles pointing in opposite directions.

The linkage according to the invention allows 10 the attached implement to follow the contours of the ground by virtue of the joints allowing the implement to pivot up and down and also to twist around a longitudinal axis so that one side of the implement may be higher than the other. The use of such a linkage ensures that the implement remains essentially parallel to the vehicle so that its direction can be readily controlled and swaying of the implement during transport is prevented. The provision of the second link provides vertical support to the implement to prevent it from 'nose-diving'.

Optionally, a lifting device may be provided to raise and lower the implement out of and into engagement with the ground. A preferred form of device for this purpose comprises a hydraulically operated piston mounted upon the implement and adapted to push downwardly upon a part of the linkage in order to raise the implement.

Restraining devices such as chains may be provided between the two links to restrict their relative movement in order to prevent the implement from twisting beyond a certain point.

DESCRIPTION OF THE DRAWINGS

In the drawings:

FIG. 1 is a simplified schematic perspective view of a vehicle linkage incorporating one embodiment of the invention.

DETAILED DESCRIPTION OF THE INVENTION

A preferred embodiment of the invention will now be described, by way of example only, and with reference to the accompanying drawing, which is a perspective view of a linkage according to the invention used to couple a truck to a snow-plough.

The drawing depicts a truck 10 coupled to a snow-plough 11 by means of a linkage 12 according to the invention. The linkage comprises two triangular steel links 13, 14 connected at each corner to either the truck or the snow-plough. The joints 15 are clevis joints forming unidirectional pivots around the pin of each joint. The two joints 16 comprise ball joints each having a ball 17 partially surrounded by a part of the link 19 and a pin 18 extending transversely through the ball 17 and the upstanding sides of the clevis 23. Thus the ball joint joining the link 13 to the snow-plough 12 provides pivotal motion around a generally longitudinal axis of the link 13 and around a line transverse to that axis by means of the part 19 of the link 13 moving around the ball 17. The ball joint at the apex of link 14 operates in a similar fashion.

A hydraulic cylinder 22 is mounted within the two upstanding sides of the clevis 23 and operates a piston 24 pivotally joined to a cross-member 25 of link 14. Activation of the hydraulic cylinder to push the link 14 downwards serves to raise the snow-plough relative to the truck.

I claim:

1. A linkage for coupling a vehicle to a ground-engaging implement to allow said ground-engaging implement to be lifted and tilted, said linkage comprising a first link and a second link, each said link having a first end and a second end and a longitudinal axis passing through the first and second ends of each said link, said first end of said first link being pivotally connected to the vehicle to allow pivotal movement between the vehicle and the first end of said first link both around said longitudinal axis of said first link and around a line transverse to said longitudinal axis of said first link, and said second end of said first link being pivotally connected to the ground-engaging implement to allow pivotal movement between the ground-engaging implement and the second end of said first link only around a line transverse to said longitudinal axis of said first link; said first end of said second link being pivotally connected to the vehicle to allow pivotal movement between the vehicle and the first end of said second link only around a line transverse to said longitudinal axis of said second link and said second end of said second link being pivotally connected to the ground-engaging implement to allow pivotal movement between the ground-engaging implement and the second end of said second link around said longitudinal axis of said second link and also around a line transverse to said longitudinal axis of said second link.

2. A linkage as claimed in claim 1 wherein said first link and said second link each comprises a connection member of predetermined shape.

3. A linkage as claimed in claim 2 wherein each said first and second link has a surface which forms a continuous plane.

4. A linkage as claimed in claim 2 wherein each said first and second link comprises a framework.

5. A linkage as claimed in claim 2 wherein said first link and said second link are of a similar shape and size.

6. A linkage as claimed in claim 2 wherein the connection member is of triangular shape.

7. A linkage for coupling a vehicle to a ground-engaging implement to allow said ground-engaging implement to be lifted and tilted, said linkage comprising a first link and a second link, each said link having a first end and a second end and a longitudinal axis passing through the first and second ends of each said link, said first link being joined at one end to the vehicle by a multidirectional joint permitting pivotal movement between the vehicle and the one end of said first link both around said longitudinal axis of said first link and around a line transverse to said longitudinal axis of said first link and joined at its other end to the ground-engaging implement by a unidirectional joint permitting pivotal movement between the ground-engaging implement and the other end of said first link only around a line transverse to said longitudinal axis of the first link; and said second link being joined at one end to the vehicle by a unidirectional joint permitting pivotal movement between the vehicle and the one end of said second link only around a line transverse to the longitudinal axis of said second link and joined at its other end to the ground-engaging implement by a multidirectional joint permitting pivotal movement between the ground-engaging implement and the other end of said second link around the longitudinal axis of said second link and also around a line transverse to said longitudinal axis of said second link.

8. A linkage according to claim 7 wherein said multidirectional joint is a combination of simple pivots.

9. A linkage as claimed in claim 7 wherein said multidirectional joint is a pin pivot permitting pivotal movement both around the axis of the pivot and in another direction.

10. A linkage as claimed in claim 7 wherein said multidirectional joint is a pinned ball joint.

11. A linkage as claimed in claim 7 wherein said unidirectional joint is a clevis joint.

12. A linkage as claimed in claim 7 wherein said unidirectional joint is an elongate hinged connection which extends across a predetermined width.

13. A linkage for coupling a vehicle to a ground-engaging implement to allow said ground-engaging implement to be lifted and tilted, comprising first and second links disposed one above the other and spaced apart vertically, each said link having a first end and a second end and a longitudinal axis passing through the first and second ends of each said link, said first end of said first link being joined to the vehicle to allow pivotal movement between the vehicle and the first end of said first link both around said longitudinal axis of said first link and around a line transverse to said longitudinal axis of said first link and said second end of said first link being joined to the ground-engaging implement to allow pivotal movement between the ground-engaging implement and the second end of said first link only around a line transverse to said longitudinal axis of said first link; said first end of said second link being joined to the vehicle to allow pivotal movement between the vehicle and the first end of said second link only around a line transverse to said longitudinal axis of said second link and said second end of said second link being joined to the ground-engaging implement to allow pivotal movement between the ground-engaging implement and the second end of said second link around a longitudinal axis of said second link and also around a line transverse to said longitudinal axis of said second link.

14. A linkage as claimed in claim 13 having restraining devices between said first link and said second link to restrict movement of said links relative to each other.

15. A linkage for coupling a vehicle to a ground-engaging implement to allow said ground-engaging implement to be lifted and tilted, comprising first and second links, each said link having a first end and a second end and a longitudinal axis passing through the first and second ends of each said link, said first end of said first link being pivotally connected to the vehicle to allow pivotal movement between the vehicle and the first end of said first link both around said longitudinal axis of said first link and around a line transverse to said longitudinal axis of said first link and said second end of said first link being joined to the ground-engaging implement by a plurality of spaced-apart unidirectional joints, to allow pivotal movement between the ground-engaging implement and the second end of said first link only around a line transverse to the longitudinal axis of said first link, said first end of said second link being pivotally connected to the vehicle along a line by a plurality of unidirectional joints spaced apart along said line to allow pivotal movement between the vehicle and the first end of said second link only around a line transverse to the longitudinal axis of said second link and said second end of said second link being pivotally connected to the ground-engaging implement to allow pivotal movement between the ground-engaging implement and the second end of said second link around said longitudinal axis of said second link and also around a line transverse to said longitudinal axis of said second link.

16. A linkage according to claim 15 having two unidirectional joints, one at each side of an end of one said link, which three joints together define the corners of an isosceles triangle when viewed in plan.

17. A linkage according to claim 16 wherein each link comprises an isosceles triangle having a joining point at or near each corner, the links being vertically spaced one above the other with the apex of the respective triangles pointing in opposite directions.

18. A linkage for coupling a vehicle to a ground-engaging implement comprising a first link and a second link, each said link having a first end and a second end and a longitudinal axis passing through the first and second ends of each said link, said first end of said first link being pivotally connected to the vehicle to allow pivotal movement between the vehicle and the first end of said first link both around said longitudinal axis of said first link and around a line transverse to said longitudinal axis of said first link and said second end of said first link being pivotally connected to the ground-engaging implement to allow pivotal movement between the ground-engaging implement and the second end of said first link around a line transverse to said longitudinal axis of said first link; said first end of said second link being pivotally connected to the vehicle to allow pivotal movement between the vehicle and the first end of said second link around a line transverse to the longitudinal axis of said second link and said second end of said second link being pivotally connected to the ground-engaging implement to allow pivotal movement between the ground-engaging implement and the second end of said second link around said longitudinal axis of said second link and also around a line transverse to said longitudinal axis of said second link and a lifting device to raise and lower the ground-engaging implement out of and into engagement with the ground.

19. A linkage as claimed in claim 18 wherein said lifting device comprises a hydraulically operated piston mounted upon the ground-engaging implement and adapted to push downwardly upon a part of the linkage in order to raise the ground-engaging implement.

* * * * *